US008046162B2

(12) United States Patent
Nonaka

(10) Patent No.: US 8,046,162 B2
(45) Date of Patent: Oct. 25, 2011

(54) DATA BROADCAST METHOD FOR TRAFFIC INFORMATION

(75) Inventor: Ryoichi Nonaka, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 955 days.

(21) Appl. No.: 11/266,879

(22) Filed: Nov. 4, 2005

(65) Prior Publication Data

US 2007/0106454 A1 May 10, 2007

(51) Int. Cl.
*G01C 21/00* (2006.01)

(52) U.S. Cl. ........ 701/201; 701/200; 701/117; 701/118; 701/209; 701/211

(58) Field of Classification Search .................. 701/200, 701/201, 207–209, 213, 117, 118, 119, 210, 701/211; 340/988, 989, 955.1, 995.12, 995.13; 342/22, 60
See application file for complete search history.

(56) References Cited

U.S. PATENT DOCUMENTS 4,907,159 A * 3/1990 Mauge et al. ................. 701/117
5,182,555 A 1/1993 Sumner
5,206,641 A * 4/1993 Grant et al. ................... 340/905
5,323,155 A 6/1994 Iyer et al.
5,396,228 A 3/1995 Garahi
5,551,064 A 8/1996 Nobbe et al.
5,635,924 A * 6/1997 Tran et al. ..................... 340/905
5,635,931 A 6/1997 Franaszek et al.
5,636,245 A 6/1997 Ernst et al.
5,648,768 A 7/1997 Bouve
5,649,300 A 7/1997 Snyder et al.
5,664,948 A 9/1997 Dimitriadis et al.
5,671,195 A 9/1997 Lee
5,682,525 A 10/1997 Bouve et al.
5,699,056 A 12/1997 Yoshida
5,732,383 A * 3/1998 Foladare et al. ........... 455/456.5
5,771,459 A * 6/1998 Demery et al. ............... 455/517
5,774,827 A 6/1998 Smith et al.
5,802,545 A 9/1998 Coverdill
5,862,510 A 1/1999 Saga et al.
5,864,305 A 1/1999 Rosenquist
5,878,056 A 3/1999 Black et al.
(Continued)

FOREIGN PATENT DOCUMENTS

DE 10 2004 017091 10/2005
(Continued)

OTHER PUBLICATIONS

"What is BNF Notation"; http://cui.unige.ch/db-research/Enseignement/analyseinfo/AboutBNF.html.

(Continued)

*Primary Examiner* — Mary Cheung
*Assistant Examiner* — Jerrah Edwards
(74) *Attorney, Agent, or Firm* — Plumsea Law Group, LLC

(57) ABSTRACT

Systems and methods are provided for prioritizing traffic information and broadcasting the traffic information in a prioritized order. The method generally comprises receiving data regarding traffic conditions on various roads, wherein each road can be characterized as being a major, medium, or minor road. In one approach, traffic data regarding major roads are broadcast to vehicles first, followed by traffic data regarding medium roads, while traffic data regarding minor roads are either broadcast last or not at all, depending on the traffic information handling capacities of the vehicles and the traffic information system in general.

17 Claims, 9 Drawing Sheets

U.S. PATENT DOCUMENTS 5,892,463 A 4/1999 Hikita et al.
5,926,108 A 7/1999 Wicks et al.
5,953,503 A 9/1999 Mitzenmacher
5,959,577 A 9/1999 Fan et al.
5,982,298 A 11/1999 Lappenbusch et al.
5,999,882 A 12/1999 Simpson et al.
6,032,046 A 2/2000 Nakano
6,078,865 A 6/2000 Koyanagi
6,085,146 A 7/2000 Kuribayashi et al.
6,088,699 A 7/2000 Gampper et al.
6,111,521 A 8/2000 Mulder et al.
6,169,894 B1 1/2001 McCormick et al.
6,208,932 B1 3/2001 Ohmura et al.
6,208,935 B1 3/2001 Yamada et al.
6,212,388 B1 4/2001 Seo
6,240,364 B1 5/2001 Kerner et al.
6,266,607 B1 7/2001 Meis et al.
6,266,608 B1 7/2001 Pertz
6,297,748 B1 10/2001 Lappenbusch et al.
6,317,686 B1 11/2001 Ran
6,329,925 B1 12/2001 Skiver et al.
6,351,709 B2 2/2002 King et al.
6,381,533 B1 4/2002 Crane et al.
6,397,067 B1 5/2002 Tanaka et al.
6,408,307 B1 6/2002 Semple et al.
6,438,490 B2 8/2002 Ohta
6,453,329 B1 9/2002 Dodgen
6,480,145 B1 11/2002 Hasegawa
6,522,250 B1 2/2003 Ernst et al.
6,529,143 B2 3/2003 Mikkola et al.
6,539,302 B1 3/2003 Bender et al.
6,542,822 B1 4/2003 Froeberg
6,546,333 B2 4/2003 Tanaka et al.
6,552,682 B1 4/2003 Fan
6,553,313 B1 4/2003 Froeberg
6,583,734 B2 6/2003 Bates et al.
6,587,777 B1 7/2003 St. Pierre
6,587,787 B1 7/2003 Yokota
6,590,507 B2 7/2003 Burns
6,594,576 B2 7/2003 Fan et al.
6,603,405 B2 8/2003 Smith
6,609,004 B1 8/2003 Morse et al.
6,611,753 B1 8/2003 Millington
6,615,130 B2 9/2003 Myr
6,615,133 B2 9/2003 Boies et al.
6,618,669 B2 9/2003 Ota et al.
6,636,721 B2 10/2003 Threadgill et al.
6,657,558 B2 12/2003 Horita et al.
6,664,922 B1 12/2003 Fan
6,680,694 B1 1/2004 Knockeart et al.
6,697,633 B1 2/2004 Dogan et al.
6,707,421 B1 3/2004 Drury et al.
6,711,398 B1 3/2004 Talaie et al.
6,714,797 B1 3/2004 Rautila
6,720,920 B2 4/2004 Breed et al.
6,730,940 B1 5/2004 Steranka et al.
6,741,188 B1 5/2004 Miller et al.
6,748,317 B2 6/2004 Maruyama et al.
6,757,712 B1 6/2004 Bastian et al.
6,785,551 B1 8/2004 Richard
6,798,358 B2 9/2004 Joyce et al.
6,810,323 B1 10/2004 Bullock et al.
6,810,328 B2 10/2004 Yokota et al.
6,812,860 B1 11/2004 Schwarzwalder, Jr.
6,812,888 B2 11/2004 Drury et al.
6,816,778 B2 11/2004 Diaz
6,823,263 B1 11/2004 Kelly et al.
6,826,472 B1 * 11/2004 Kamei et al. .................. 701/202
6,836,667 B1 12/2004 Smith, Jr.
6,847,889 B2 1/2005 Park et al.
6,859,720 B2 2/2005 Satoh et al.
6,859,728 B2 2/2005 Sakamoto et al.
6,978,206 B1 * 12/2005 Pu et al. ........................ 701/200
6,985,089 B2 * 1/2006 Liu et al. ........................ 340/903
6,990,407 B1 * 1/2006 Mbekeani et al. ............ 701/117
7,043,357 B1 * 5/2006 Stankoulov et al. .......... 701/200
7,062,379 B2 * 6/2006 Videtich ....................... 701/210
7,096,115 B1 8/2006 Groth et al.
7,124,023 B2 * 10/2006 Peeters ......................... 701/209
7,139,659 B2 11/2006 Mbekeani et al.
7,680,596 B2 * 3/2010 Uyeki et al. .................. 701/210
2001/0001848 A1 5/2001 Oshizawa et al.
2002/0016655 A1 2/2002 Joao
2002/0049531 A1 4/2002 Tanaka et al.
2002/0058501 A1 5/2002 Mazzaea et al.
2002/0059462 A1 5/2002 Hannu et al.
2002/0067289 A1 6/2002 Smith
2002/0072378 A1 6/2002 Gaal
2002/0077741 A1 6/2002 Hanebrink
2002/0103597 A1 8/2002 Takayama et al.
2002/0152021 A1 10/2002 Ota et al.
2002/0161841 A1 10/2002 Kinnunen
2002/0165662 A1 11/2002 Maruyama et al.
2002/0165665 A1 11/2002 Kim
2002/0198632 A1 12/2002 Breed et al.
2003/0009595 A1 1/2003 Collins
2003/0028312 A1 2/2003 Matsuoka et al.
2003/0051239 A1 3/2003 Hudspeth
2003/0069683 A1 4/2003 Lapidot
2003/0081587 A1 5/2003 Ichiyoshi
2003/0083813 A1 5/2003 Park
2003/0093476 A1 5/2003 Syed
2003/0097477 A1 * 5/2003 Vossler ......................... 709/248
2003/0125866 A1 7/2003 Mori et al.
2003/0169182 A1 9/2003 Wilhelm et al.
2003/0195695 A1 10/2003 Maruyama et al.
2003/0216859 A1 11/2003 Martell et al.
2003/0225516 A1 12/2003 DeKock et al.
2003/0229441 A1 12/2003 Pechatnikov et al.
2003/0236613 A1 12/2003 Satoh et al.
2004/0012501 A1 1/2004 Mazzaea et al.
2004/0024753 A1 2/2004 Chane et al.
2004/0059781 A1 3/2004 Yoakum et al.
2004/0068362 A1 4/2004 Maekawa et al.
2004/0068364 A1 4/2004 Zhao et al.
2004/0073356 A1 4/2004 Craine
2004/0080430 A1 4/2004 Videtich
2004/0102898 A1 5/2004 Yokota et al.
2004/0104842 A1 6/2004 Drury et al.
2004/0110515 A1 6/2004 Blumberg et al.
2004/0148099 A1 7/2004 Kim
2004/0167707 A1 8/2004 Bragansa et al.
2004/0198217 A1 10/2004 Lee et al.
2004/0203630 A1 10/2004 Wang
2004/0204821 A1 10/2004 Tu
2004/0204842 A1 10/2004 Shinozaki
2004/0208204 A1 10/2004 Crinon
2004/0233070 A1 11/2004 Finnern
2004/0233101 A1 11/2004 Kim
2004/0239531 A1 12/2004 Adamczyk
2004/0249565 A1 * 12/2004 Park ............................. 701/200
2004/0252197 A1 12/2004 Fraley et al.
2005/0001743 A1 1/2005 Haemerle
2005/0015199 A1 1/2005 Lokshin et al.
2005/0027436 A1 2/2005 Yoshikawa et al.
2005/0027449 A1 2/2005 Marsh
2005/0033511 A1 2/2005 Pechatnikov et al.
2005/0038596 A1 2/2005 Yang et al.
2005/0043060 A1 * 2/2005 Brandenberg et al. ........ 455/558
2005/0043880 A1 2/2005 Yamane et al.
2005/0065713 A1 * 3/2005 Yamada et al. ............... 701/200
2005/0075095 A1 4/2005 Dillon
2005/0085182 A1 * 4/2005 Chuberre et al. ............ 455/3.01
2005/0137790 A1 6/2005 Yamada et al.
2005/0221876 A1 * 10/2005 Van Bosch et al. ........ 455/575.9
2005/0222760 A1 10/2005 Cabral et al.
2005/0273218 A1 12/2005 Breed et al.
2006/0062156 A1 * 3/2006 Stultz et al. ................... 370/252
2006/0217875 A1 * 9/2006 Oesterling et al. ............ 701/200

FOREIGN PATENT DOCUMENTS

EP 1137210 9/2001
EP 1276088 1/2003
JP 8149029 6/1996
JP 2000112978 4/2000
JP 2000293788 10/2000
JP 2001168743 6/2001

| | | |
|---|---|---|
| JP | 2001343979 | 12/2001 |
| JP | 2003122785 | 4/2003 |
| JP | 6276056 | 9/2004 |
| WO | 97/01940 | 1/1997 |
| WO | WO 98/06028 | 2/1998 |

OTHER PUBLICATIONS

"Jonathan: The IDL preprocessor"; http://pauillac.inria.fr/cdrom/www/jonathan/doc/hrefs/jpp.html.
"Maximum Compression: Lossless data compression software benchmarks/comparisons"; http://www.maximumcompression.com/.
"What is LZW"; http://webopedia.internet.com/TERM/L/LZW.html.
"ECMA—Data Compression for Information Interchange—Adaptive Coding with Embedded Dictionary—DCLZ Algorithm"; http://www.ecma-international.org/publications/files/ECMA-ST/Ecma-151.PDF.
"Innovation—Focus On: IAM (Innovation Access Method), New Features, Questions & Answers, Hints & Recommendations"; http://www.innovationdp.fdr.com/products/iam/pdf/FYIiam.pdf.
"Data Compression: The Complete Reference", D. Salomon ; New York, NY: Springer, US, 1998, pp. 101-162,357,XP002150106; ISBN: 0-387-98280-9; p. 101, line 9-line 23; p. 112-p. 113.
Japanese Decision of Rejection mailed Oct. 27, 2009 from Japanese Application No. 2007-507441 and English translation.
Japanese Office Action dated Nov. 4, 2009 from Japanese Patent Application No. 2006-545357 and English translation.
U.S. Office Action mailed Oct. 14, 2009 from U.S. Appl. No. 10/737,221.

* cited by examiner

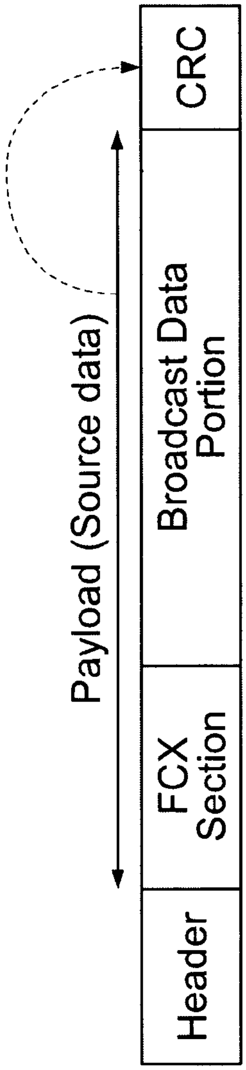
FIG. 5a
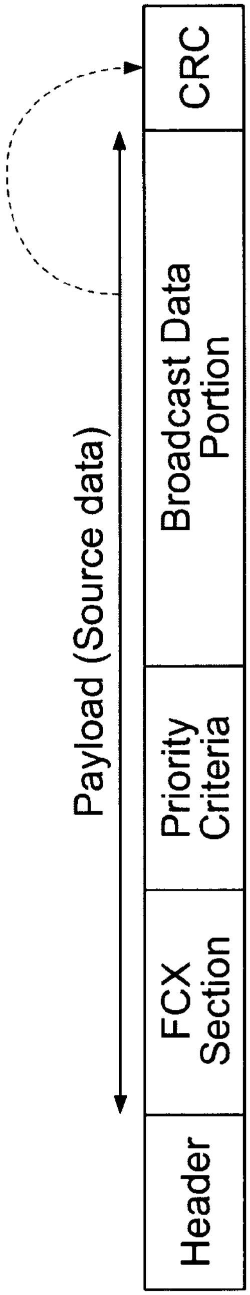
FIG. 5b
| bit 1 | bit 0 | Road Type/Class |
|---|---|---|
| 0 | 0 | Unknown |
| 0 | 1 | Minor |
| 1 | 0 | Medium |
| 1 | 1 | Major |
FIG. 5c

Header for Single Packet

| Sync Byte | Packet Type | Payload Length (Source Data Length) | Data Serial Number | Header CRC |
|---|---|---|---|---|
| 1 Byte | 2 Bytes | 1-4 Bytes | 4 Bytes | 2 Bytes |

FIG. 8

Header for Multi Packet

| Sync Byte | Packet Type | Total Packet Quantity | Packet Serial Number | Source Data Length | Payload Length | Data Serial Number | Header CRC |
|---|---|---|---|---|---|---|---|
| 1 Byte | 2 Bytes | 1 Byte | 1 Byte | 1-4 Bytes | 1-4 Bytes | 4 Bytes | 2 Bytes |

FIG. 9

DATA BROADCAST METHOD FOR TRAFFIC INFORMATION

BACKGROUND OF THE INVENTION

1. Field of the Invention

The present invention relates to a method and system for communicating information to vehicles from a remote location, and more particularly, to a method and system for prioritizing traffic information and broadcasting the prioritized traffic information to the vehicles.

2. Description of Related Art

Navigation systems for determining a route from a start point to a destination point are well known in the art. In addition, navigation systems having capabilities for determining the geographic position of a reference point are also well known in the art, such as a Global Positioning System (GPS) or a self-contained system having distance and bearing sensors. As an example, a commonly used navigation system allows a user (or driver) of a vehicle to enter a destination into the navigation system. The navigation system then looks up an appropriate route from an original point (using its geographic positioning capabilities) to the destination point in a road map database (e.g., the route may be a route having the shortest distance from the start point to the destination point, one which would take the vehicle the least time, or some other route), and guides the user to the destination along the searched route through a visual display or vocal guide.

In searching the appropriate route, some types of mobile navigation system use traffic information (e.g., position data on traffic jams; information on roads closed by accidents, construction, or maintenance; lane-regulated locations) delivered from a traffic information supplier in addition to using the road map database. Conventionally, however, known methods for providing and utilizing the above-described traffic information for navigation remain very inflexible, cumbersome, and inefficient. For example, in certain methods, the same traffic information is transmitted to many or all vehicles in a given geographic region. A drawback with these methods is that many vehicles are inundated with a large amount of traffic information. Users and/or navigation systems are required to sift through the redundant, superfluous, or otherwise unwanted information to pick out pertinent traffic information.

As a result, there remains a need for systems and methods that allow for the transmittal of vehicle-relevant traffic information from a remote location to one or more vehicles. Moreover, it is desired that the navigation system be provided with enough information to properly determine efficient routes without being inundated with low priority, redundant, or superfluous traffic information. There is a need that the traffic information be provided to a user in a useful, prioritized, and efficient manner.

Accordingly, it would be very desirable to provide a traffic information management system and method that overcomes the above-described shortcomings of the prior art while retaining their advantages.

SUMMARY OF THE INVENTION

The present invention provides a system and method for prioritizing traffic information and broadcasting the traffic information to one or more vehicles in a prioritized order.

In accordance with one aspect of the embodiments described herein, there is provided a system for communicating traffic information to at least one vehicle from a remote location in a prioritized order. The system generally comprises an information center for generating and prioritizing broadcast data messages regarding road traffic conditions, and for sending the broadcast data messages in the prioritized order. The system further comprises a relay section that receives the prioritized broadcast data messages sent from the information center and relays the broadcast data messages to the at least one vehicle according to the prioritized order. In one embodiment, the information center assigns a priority rating to each broadcast data message based on the type of road (e.g., a major, medium or minor road type) for which the traffic information is broadcast.

In accordance with another aspect of the embodiments described herein, there is provided a method for creating and broadcasting broadcast data messages to at least one vehicle in a prioritized order. The method generally comprises receiving first and second data packets regarding traffic conditions on first and second roads, respectively, the first and second roads having first and second characteristics (e.g., road type, whether road is on vehicle's route to destination, etc.), respectively. First and second priority ratings are generated based on the first and second characteristics, respectively. The method further comprises concatenating the data packets and the priority ratings to generate broadcast data messages that are broadcast to the at least one vehicle. In one approach, the first broadcast data message is broadcast before the second broadcast data message if the first priority rating is higher than the second priority rating, while the second broadcast data message is broadcast before the first broadcast data message if the second priority rating is higher than the first priority rating.

BRIEF DESCRIPTION OF THE DRAWINGS

FIG. 5*a* is a block diagram of an embodiment of a single-packet broadcast data message;

FIG. 5*b* is a block diagram of another embodiment of a single-packet broadcast data message;

FIG. 5*c* is a block diagram of a packet type field for the priority rating encoded into a broadcast data message;

FIG. 8 is a block diagram of a header for a single-packet message; and

FIG. 9 is a block diagram of a header for a multi-packet message.

DETAILED DESCRIPTION OF THE PREFERRED EMBODIMENT

The present invention satisfies the need for a system and method for prioritizing information and broadcasting the prioritized information. In particular, the present invention is directed to a system and method for prioritizing and broadcasting traffic information. In the detailed description that follows, like element numerals are used to describe like elements illustrated in one or more of the figures.

Figure 1A:
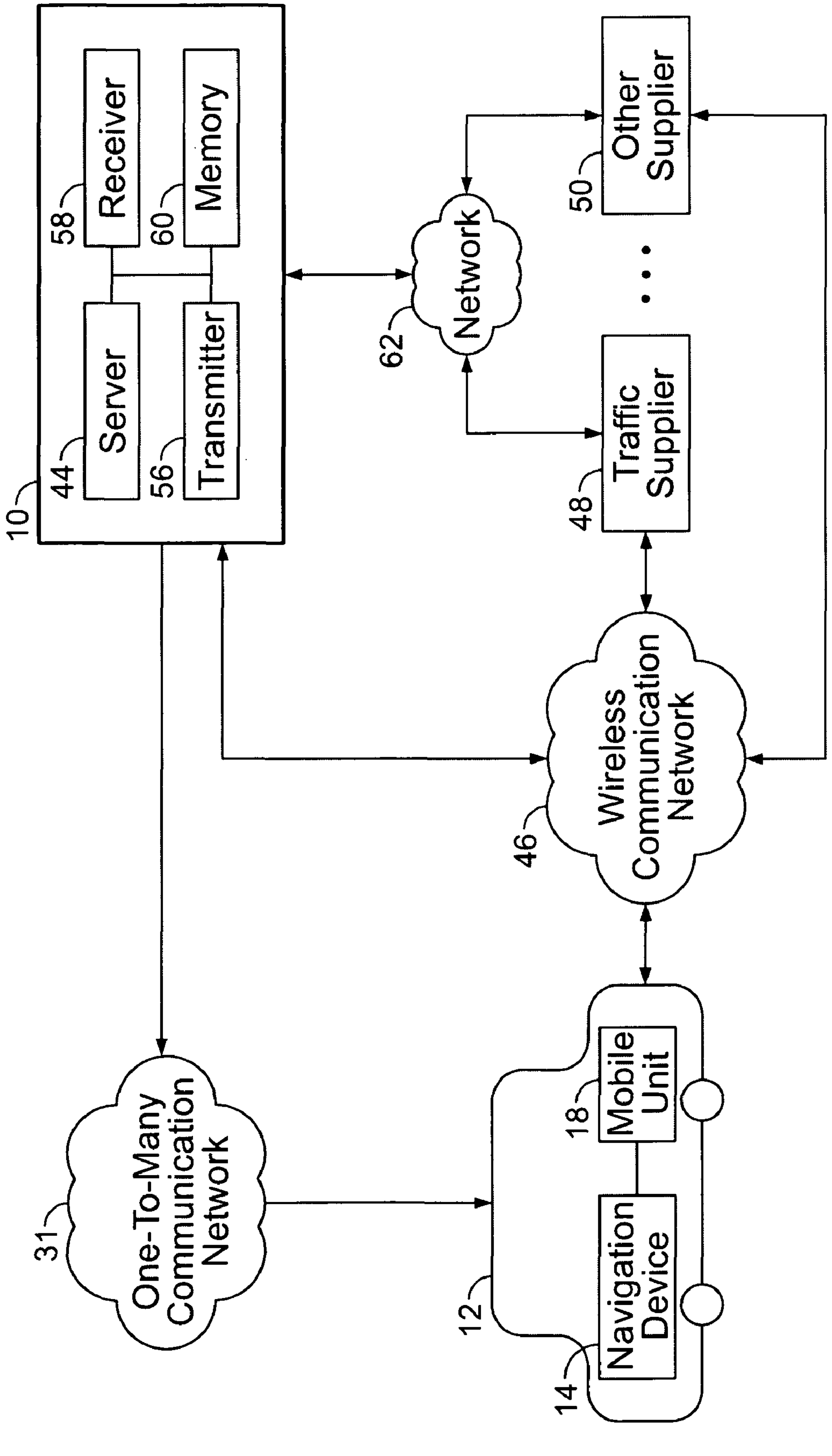
FIG. 1*a* is a schematic diagram of a first embodiment of a system pursuant to aspects of the invention.
Figure 1B:
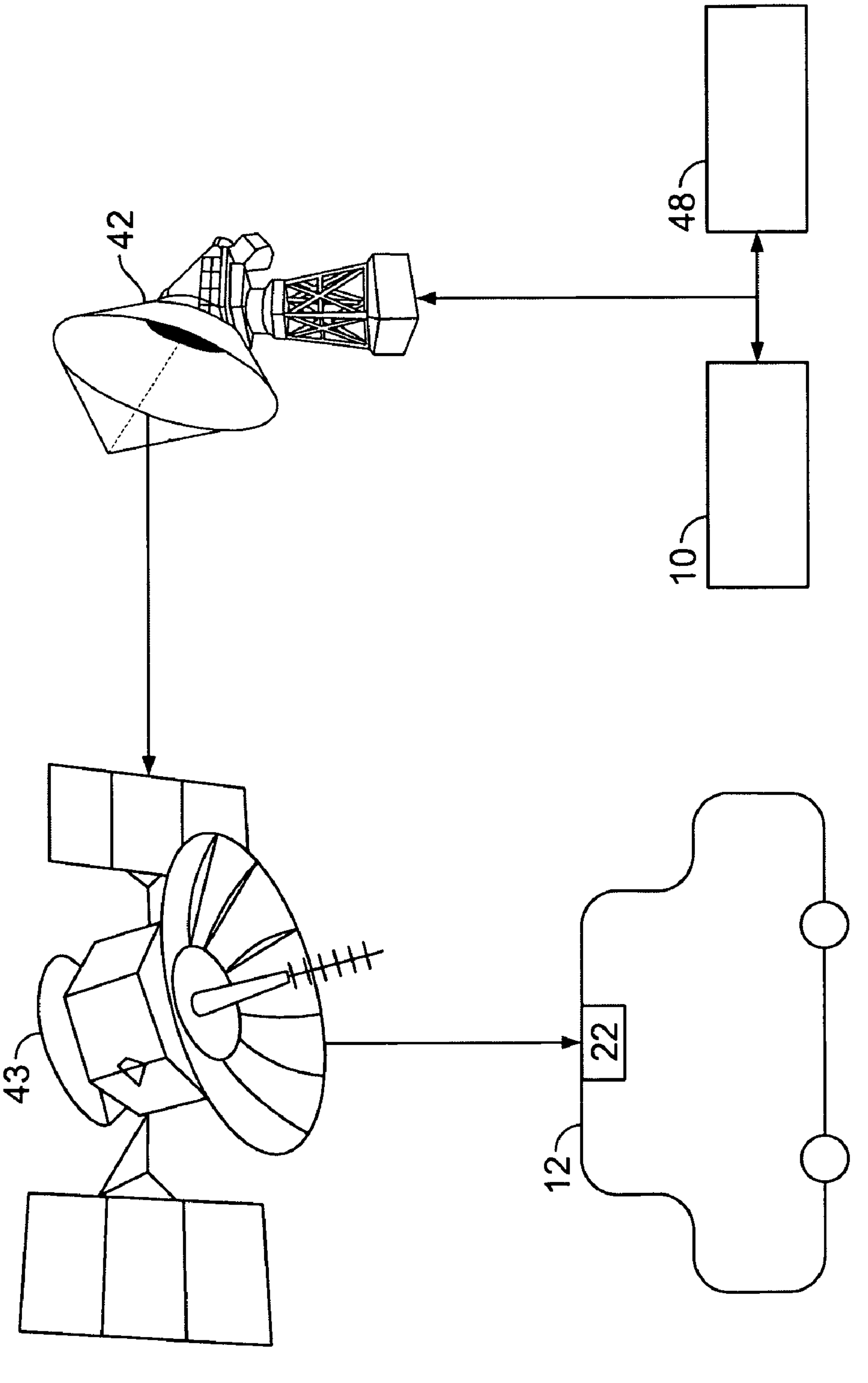
FIG. 1*b* is a schematic diagram of a broadcast communication network.
Figure 1C:
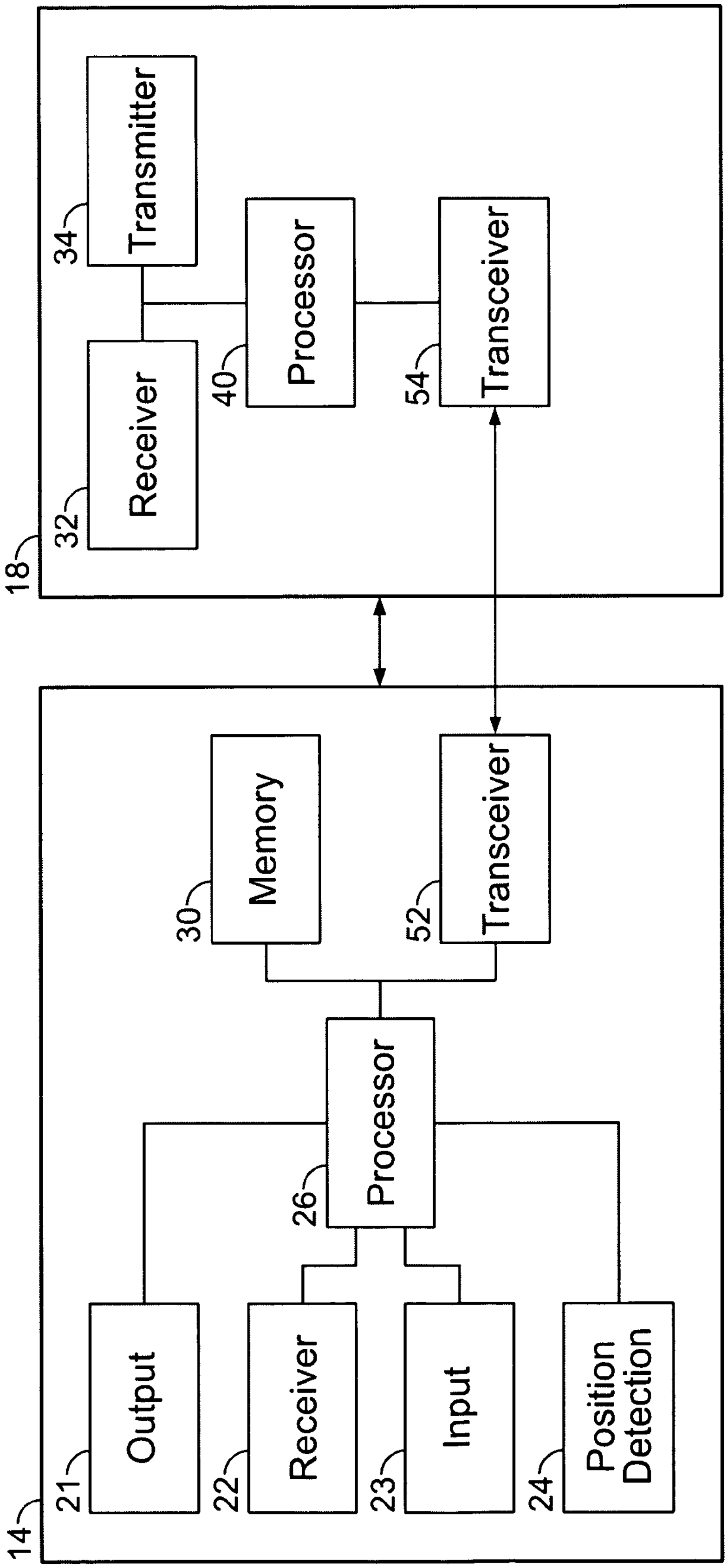
FIG. 1*c* is a schematic diagram of a navigation device in communication with a mobile unit.

With reference to FIG. 1*a*, there is provided a first embodiment of a system for facilitating the exchange of information between a remote location 10 and a vehicle 12 pursuant to aspects of the invention. The vehicle 12 includes a navigation device 14. Referring now also to FIG. 1*c*, the navigation device 14 may include an output unit 21, a receiver unit 22, an input unit 23, a position detection unit 24, a navigation memory unit 30, a navigation processor unit 26, and an RF transceiver unit 52 that are all in electrical communication with one another. The navigation memory unit 30 includes at least a portion of a user profile and in some embodiments may include the entire user profile. In addition, the navigation memory unit 30 includes a road map database portion and, in some embodiments, includes a disk reading unit for reading road map information not built into the navigation device 14. As is provided in greater detail below, the user profile and/or the road map database stored in the memory 30 may be updated in the vehicle by way of the input unit 23, which can include at least one of a keyboard, a touch sensitive display, and a microphone. The user profile and/or the road map database may also be updated by way of information received through the receiver unit 22 and/or the RF transceiver unit 52.

The receiver unit 22 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio, and satellite networks. Referring now to FIG. 1*b*, in one embodiment, the broadcast network 31 is the XM Radio satellite network 40, which comprises broadcast towers 42, satellite servers (not shown), and satellites 43. The broadcast towers 42 transmit information to the satellites 43, which bounce the information back down to the receiver unit 22 of the navigation device 14.

Referring now back to FIG. 1*c*, the information received by the receiver 22 may be processed by the navigation processor unit 26. The processed information may then be displayed by way of the output unit 21, which includes at least one of a display and a speaker. In one embodiment, the receiver unit 22, the navigation processor unit 26 and the output unit 21 are provided access to only subsets of the received broadcast information based on user preferences and/or traffic information demands. The user preferences, as well as user identity information and traffic-related information, can be part of the user profile.

The position detection unit 24 may include a GPS receiver that communicates with a plurality of GPS satellites (separate from the XM satellites) to determine the position of the vehicle 12. For example, the GPS receiver searches for and collects GPS information (or signals) broadcast from four or more GPS satellites that are in view of the GPS receiver. Next, using the time interval between the broadcast time and reception time of each broadcast signal, the GPS receiver calculates the distance between the GPS receiver and each of the four or more GPS satellites. These distance measurements, along with the position and time information received in the broadcast signals, allow the GPS receiver to calculate the geographic position of the vehicle 12.

Figure 2:
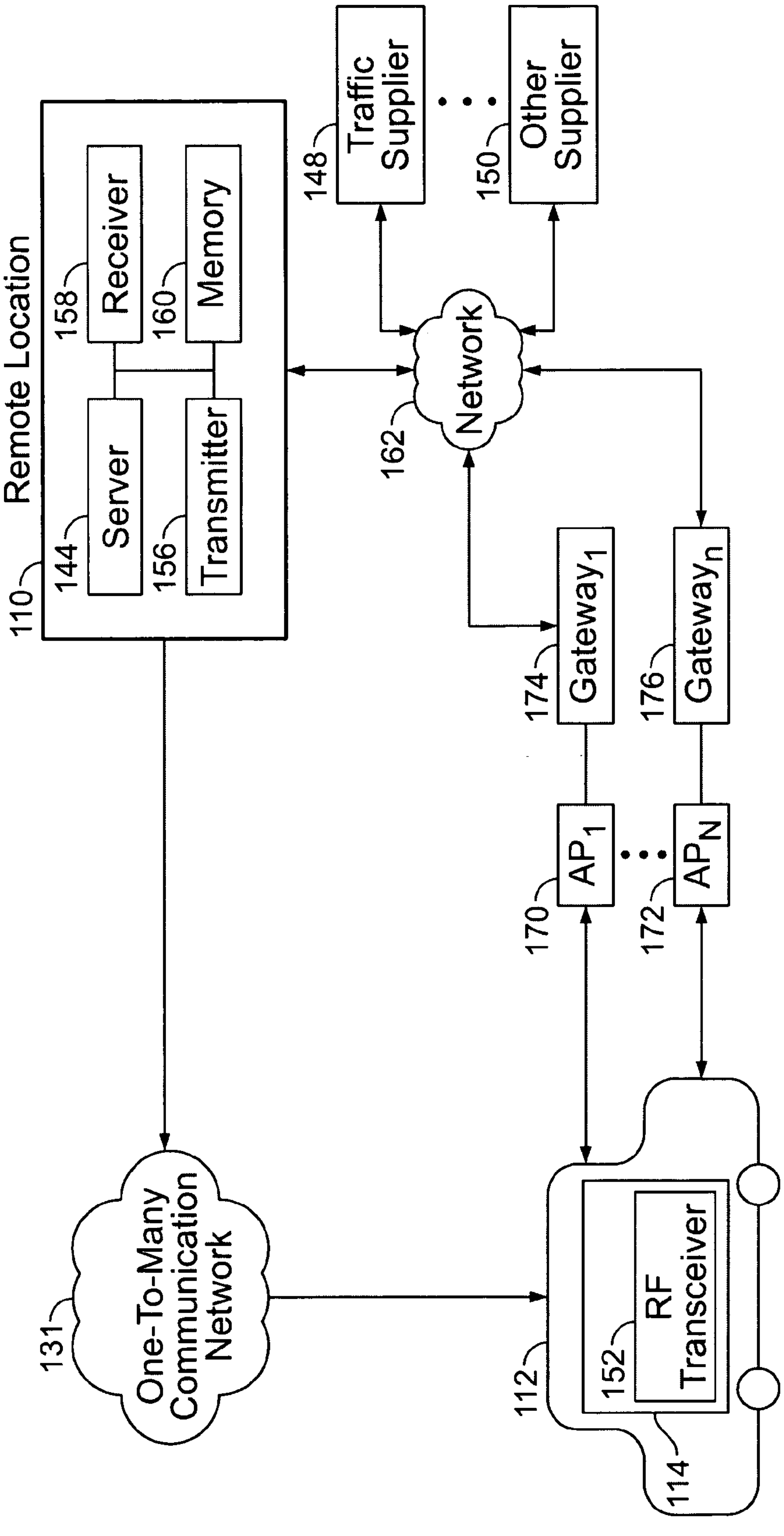
FIG. 2 is a schematic diagram of an alternate embodiment of a system.

In the embodiment shown in FIG. 1*a*, the mobile unit 18 is used to receive and transmit information from and to the remote location 10; and, in an alternate embodiment shown in FIG. 2, an RF transceiver 152 is used to receive and transmit information from and to the remote location 110. The mobile unit 18 may be a wireless phone or any other device that communicates with other devices by way of the wireless communication network 46. As shown in FIG. 1*c*, in one embodiment, the mobile unit 18 includes a wireless receiver 32, a wireless transmitter 34, a mobile unit processor 40, and an RF transceiver unit 54 that are in communication with one another. The mobile unit 18 is in two-way communication with the remote location 10 by way of the receiver 32, the transmitter 34, and the wireless communication network 46, which comprises numerous base stations. In one embodiment, information is transmitted from or to the vehicle or remote location over a high bandwidth GPRS/1XRTT channel of the wireless communication network 46. If the high bandwidth channel is unavailable, a low bandwidth DTMF channel can be used. The receiver 32 receives information from the remote location 10, and the transmitter 34 transmits information to the remote location 10. In other embodiments, the transmitter 34 also transmits information to suppliers of traffic or other information 48, 50.

In one embodiment, the information received from and transmitted to the remote location 10 by way of the mobile unit 18 is accessed by the user through the navigation device 14, which is in communication with the mobile unit 18. The mobile unit 18 may be embedded in the vehicle 12 and be in communication with the navigation device 14 by, for example, a cable (not shown).

In another embodiment, the navigation device 14 and mobile unit 18 are in communication with one another by way of RF transceiver units 54 and 52. Both the navigation device 14 and the mobile unit 18 include RF transceiver units 52, 54, which, in one embodiment, comply with the Bluetooth® wireless data communication format or the like. The RF transceiver units 52, 54 allow the navigation device 14 and the mobile unit 18 to communicate with one another. In other embodiments not shown, the receiver 32 and transmitter 14 of the mobile unit 18 and the receiver unit 20 of the navigation device 14 allow the navigation device 14 and mobile unit 18 to communicate with one another. In yet other embodiments, there may be an RF transceiver that is separate from the navigation device 14 and the mobile unit 18 and that allows the navigation device 14 and mobile unit 18 to communicate with one another.

In the alternate embodiment shown in FIG. 2, the navigation device 114 transmits and receives information to and from the remote location 110 by way of the RF transceiver 152, access points 170, 172, and gateways 174, 176 that are in communication with the network 162. In one embodiment, the RF transceiver 152 and the access points 170, 172 are compliant with the IEEE 802.11 specification, and such transceivers and access points include Wi-Fi® —certified equipment. The access points 170, 172 are typically in communication with the gateways 174, 176 by way of a cable, and the gateways are in communication with the remote location 110 by way of the network 162. The access points 170, 172 are in communication with the RF transceiver 152 and have a limited range over which they can communicate with the RF transceiver 152. Thus, it is preferable that there be numerous access points 170, 172 positioned so that the distance between the access points and the areas through which a vehicle 12 might pass is less than or equal to the limited range of the access points. When the access points 170, 172 are so positioned, the RF transceiver 152 effectively exchanges information with the access points 170, 172 and, thus, the remote location 110.

Note that in the alternate embodiment of FIG. 2, the navigation device 114 also includes input and output units, a receiver unit, a memory unit, and a processor unit, none of which are shown. The components of the alternate navigation device embodiment 114 have the same functionality as do the corresponding components of the navigation device 14 of the first embodiment.

The remote location 10, 110 includes a remote server 44, 144, a remote transmitter 56, 156 and receiver 58, 158, and a remote memory 60, 160 that are in communication with one another. As provided above, in the first embodiment, the remote transmitter and receiver 56, 58 communicate with the navigation device 14 and mobile unit 100 by way of the broadcast 31 and wireless 46 communication networks, respectively. In the alternate embodiment, the remote transmitter and receiver 156, 158 communicate with the navigation device 114, including the RF transceiver 152, by way of the broadcast communication network 131 and a network 162. The remote location 10, 110 is also in communication with suppliers of traffic and/or other information 48, 50, 148, 150 such as government traffic information suppliers, private traffic information suppliers, and users of other vehicles, by way of the network 62, 162.

In both the first and alternate embodiments shown in FIGS. 1 and 2, the network 62, 162 is typically a wide area network (WAN) such as the Internet. In other embodiments, some of the information suppliers 48, 50, 148, 150, such as the government and private traffic information suppliers, may be in communication with the remote location 10, 110 by way of a local area network (LAN), while other information providers 48, 50, 148, 150 such as the vehicle users, are in communication with the remote location by way of the Internet. In yet other embodiments, the RF transceiver 152 is in communication with the remote location 110 and/or the information providers 148, 150 by way of a network 162 that is a LAN. In these other embodiments, the LAN 162 is compliant with the IEEE 802.3 specification or is an Ethernet network.

As provided in greater detail below, the information suppliers 48, 50, 148, 150 may transmit updated user profiles and traffic-related information to the remote location 10, 110. A plurality of user profiles are in a user profile database, which, along with traffic-related information, is stored in the remote memory 60, 160. The updated user profiles and new traffic-related information are transmitted from the remote location 10, 110 to the navigation device 14, 114 by way of the broadcast network 31, 131. In other embodiments, the new traffic-related information and updated user profiles may be transmitted to the vehicles 12, 112 by way of the wireless network 46 or the network 162. At the vehicle, the user profile stored in the memory 30 of the navigation device 14 is updated, and the vehicle-related information is made accessible to the user by way of the output unit 26 of the navigation device 14. In other embodiments, the information providers may communicate directly with the mobile unit 18 or RF transceiver 152 by way of the wireless communication network 46 or the network 162.

Figure 3:
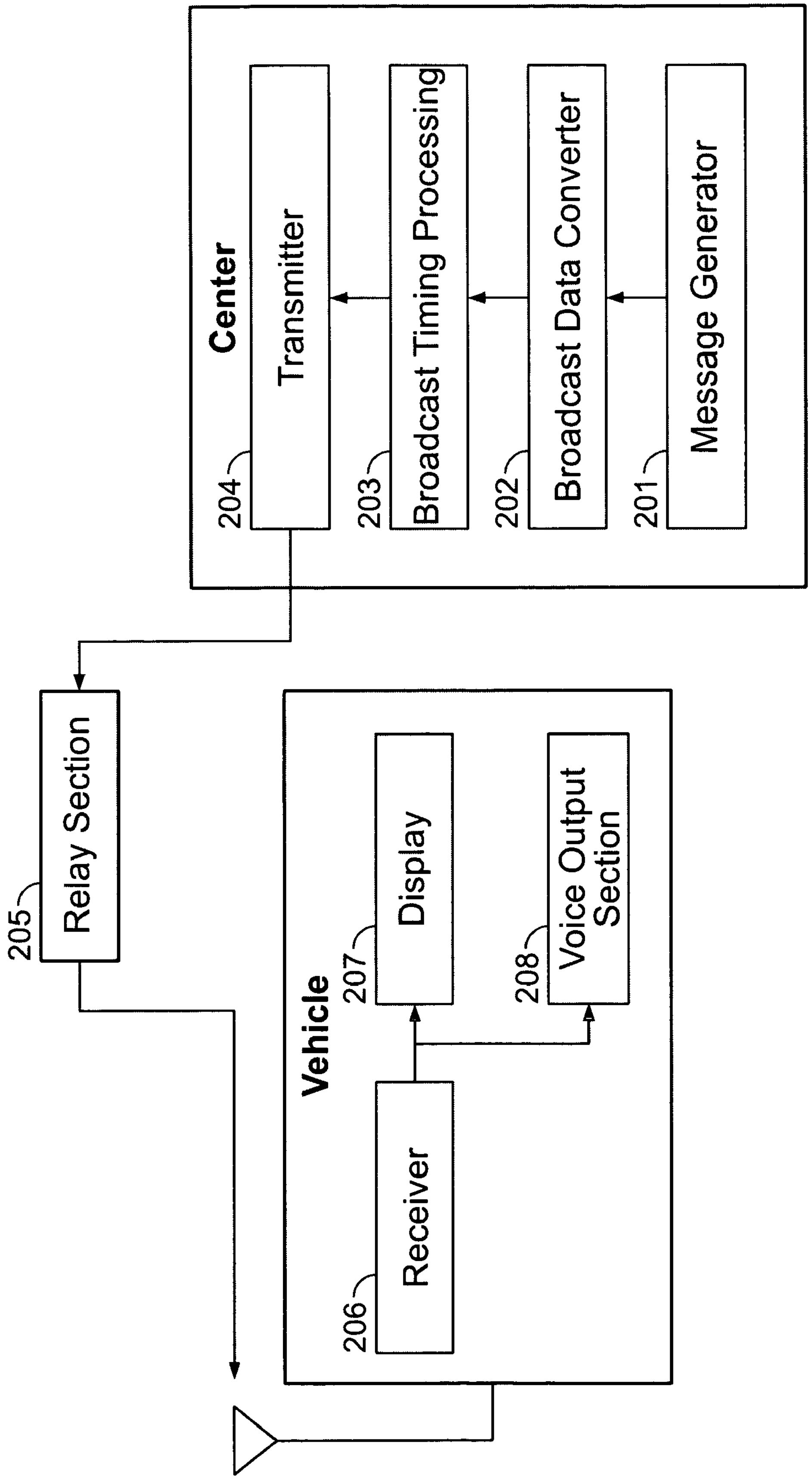
FIG. 3 is a schematic diagram of a system for communicating broadcast messages to a vehicle.

Referring now to FIG. 3, a schematic diagram of another embodiment of an information provision system for a vehicle is provided. Broadcast messages originate at a remote location referred to herein as a center. The center communicates the broadcast message via a relay section 205 to each vehicle. The medium for communicating the broadcast messages may include a one-to-many communication system (e.g., television, radio and satellite networks) that can send information from one source to a plurality of receivers, such as the XM Radio satellite network. As explained above, the broadcast messages can also be transmitted to the vehicle over a wireless communication network, such as a high bandwidth GPRS/1XRTT channel. In one embodiment, the high bandwidth channel supports data rates of about 45 Kbps to about 125 Kbps. In another embodiment, the high bandwidth channel supports data rates of about 56 Kbps to about 114 Kbps. If the high bandwidth channel is unavailable, a low bandwidth channel (e.g., a DTMF channel) can be used. In one embodiment, the low bandwidth channel supports data rates of about 1 Kbps to about 120 Kbps. In another embodiment, the low bandwidth channel supports data rates of about 30 Kbps to about 90 Kbps.

The center includes a message generator 201 for generating message data for the provision of information to the vehicle operator, a broadcast data converter 202 for converting the generated message into a broadcast data format, a broadcast timing processing section 203 that determines the timing for sending message data converted into broadcast data by the broadcast data converter 202, and a transmitter 204 for transmitting from the center the broadcast data sent from the broadcast timing processing section 203. The relay section 205 receives the broadcast data and relays it to the vehicle. It should be appreciated that the message generator 201, broadcast data converter 202, and/or broadcast timing processing section 203 may be provided by computer servers having associated memory. These servers may further include capacity to maintain data records corresponding to the vehicles and vehicle operators to which the center communicates. The broadcast data may include, for example, information related to the vehicle user such as sales campaign periods for dealers and the like, specific regional information, seasonal information, inspection periods, recall information, and lease periods, and information dispatched in accordance with need from the center, and the like. The center may also be in communication with information providers such as vehicle dealers, repair/maintenance facilities, and other service providers by way of conventional communications networks. A plurality of user profiles may be included in a user profile database, which, along with other vehicle-related information, is stored in memory at the center.

The vehicle includes a receiver 206 that is capable of receiving broadcast data relayed from the relay section 205 via a suitable antenna. The receiver 206 includes processing capability to recover or extract the broadcast data and communicate that information to a display 207 (i.e., text display device) and to a voice/audio output section or device 208 (i.e., voice message output device or speaker). The display 207 may comprise the visual display of a navigation device, or the like. The voice output section 208 may comprise the speaker of an audio device.

Figure 4:
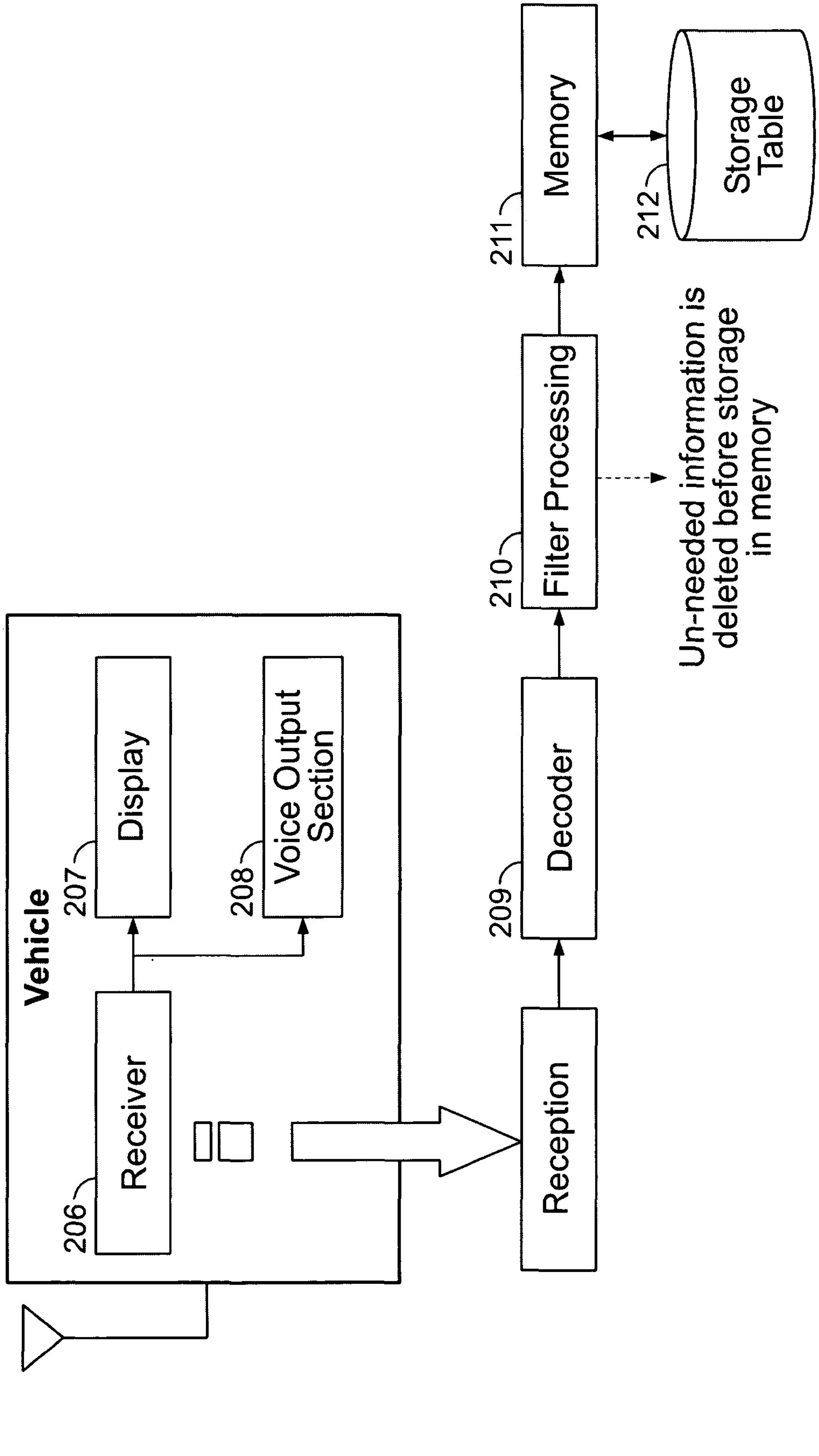
FIG. 4 is a schematic diagram of an exemplary vehicle information receiver of the system.

FIG. 4 illustrates the components of the receiver 206 in greater detail, which includes a decoder 209, a filter processing section 210, and a memory 211. The broadcast data received by the receiver 206 is decoded by decoder 209 to separate the data according to the broadcast band into broadcast data from the center and general broadcast data from the relay section 205. The memory 211 stores the broadcast data processed by the filter processing section 210. This memory 211 may comprise a storage medium, such as a hard disk, solid state memory, or other suitable memory. The filter processing section 210 permits management of the stored message packets, as will be further described below. For example, in one embodiment, un-needed information is deleted before storage in memory 211.

The center generates messages for broadcast to the vehicles having a number of alternative formats. In a first such format, a single broadcast message includes a plurality of individual message components that are each intended for specific vehicles. Each vehicle receives the entire broadcast message, and filters out the message components that are directed to other vehicles, thereby storing only the message components that are applicable to that vehicle. In another such format, the broadcast message is not intended for a specific vehicle, but rather for a class of vehicles that are a subset of the entire universe of vehicles. The broadcast message includes filter data that specifies characteristics of the intended message recipients, such as identifying the vehicle make, model, year, geographic location, and other characteristics of the particular vehicle operator (e.g., having specific lease termination dates). Each vehicle receives the broadcast message, and uses the filter data to determine whether the message components are applicable to that vehicle.

As explained above, in accordance with one aspect of the embodiments described herein, there is provided a system and method for prioritizing and broadcasting traffic information/data in a prioritized order, such that higher priority traffic information/data is broadcast more frequently than lower priority traffic information. This is beneficial because if all the traffic data were broadcast at once, it would take a long time to update the traffic data due to the large volume of data. To limit such volume problems, the present method broadcasts traffic data by order of priority. For example, in one approach, data relating to accidents on major roads are transmitted most frequently, followed by data relating to accidents on medium class roads and slow traffic on major roads, followed by data relating to construction and accidents on minor class roads.

In one approach, traffic data relating to major roads are updated more frequently than traffic data for relatively minor roads. In another approach, traffic data for roads on the vehicle's route to a destination point are updated more frequently than for roads that are not on the vehicle's route. In yet another approach, traffic data for roads that are on or the closest to the vehicle's route to a destination are updated more frequently than for roads that farther removed from the vehicle's route. The criteria (e.g., major/medium/minor road class, distance from vehicle's route to destination point, etc.) for assigning priority ratings to the traffic data/information can be varied or adjusted for each particular application, user preferences, etc.

The priority ratings for traffic information/data can be encoded into the broadcast data messages according to any known suitable approach. For example, FIG. 5*a* illustrates a block diagram of an embodiment of a single-packet broadcast data message. The exemplary data message comprises a header, a CRC code, and a payload section that comprises a filter code section (FCX) and a broadcast data portion. The priority rating can be encoded into the header and/or the broadcast data portion. FIG. 5*b* illustrates another embodiment of a broadcast data message that comprises a header, a CRC code, and a payload section that comprises an FCX, a priority criteria field/portion, and a broadcast data portion. The priority rating is preferably encoded into the priority criteria field of the payload section. In one exemplary embodiment, shown in FIG. 5*c*, the priority rating comprises the type or class of road, which is encoded with two bits of data. Major roads are denoted with a 11, while medium roads are denoted with a 10, while minor roads are denoted with a 01. A priority rating of 00 can be used if the road type is unknown.

The FCX may define certain characteristics of vehicles to which the message applies, such as vehicle type, model year, mileage, sales zone, etc., as explained in further detail in U.S. patent application Ser. No. 11/232,311, titled "Method and System for Broadcasting Data Messages to a Vehicle," filed on Sep. 20, 2005, the content of which is incorporated in its entirety into this disclosure by reference. The filter processing section 210 in the vehicle would use the criteria defined in the filter code section to determine whether to present the data message to the vehicle operator or to discard the data message. The CRC code may be generated using any suitable algorithm, such as, but not limited to, the following polynomial:

$$G(X)=X^{16}+X^{15}+X^{2}+1$$

It should be appreciated that when the same message data is broadcast to plural vehicles of a common group, and when there are large numbers of target vehicles in the target group, the overall data amount is small (i.e., the broadcast efficiency is high). The payload section may include one set of broadcast data or multiple sets of broadcast data. It will also be understood that the CRC code is merely exemplary, and that any other suitable method of checking for errors in the data message can be implemented with the present invention.

Figure 6:
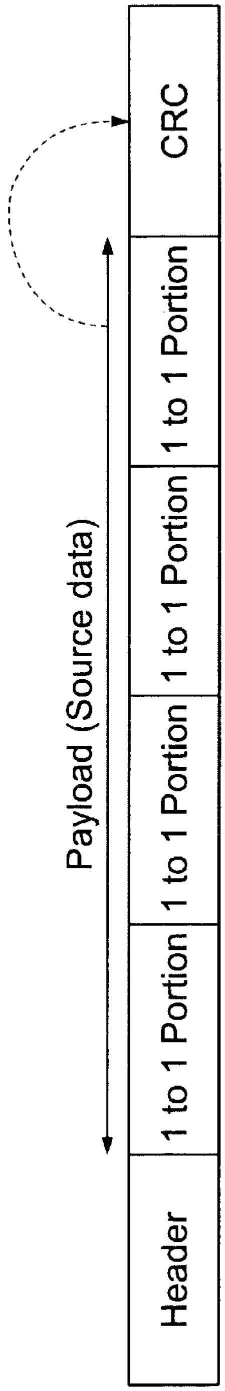
FIG. 6 is a block diagram of an embodiment of a multi-packet broadcast data message.

FIG. 6 is a block diagram of an embodiment of a multi-packet broadcast data message containing 1-to-1 linked type source data. The data message contains a plurality of message portions. Each message portion can be targeted to a single vehicle using the VIN code as the filter code section. The data message includes a header, a payload section, and a CRC code. The payload section includes the 1-to-1 linked source data. Since different data is being broadcast to each vehicle, the overall quantity (i.e., the average data quantity times the number of vehicles) tends to be large (i.e., the broadcast efficiency is degraded). Analogous to the single-packet broadcast data message shown in FIGS. 5*a* and 5*b*, the multi-packet broadcast data message can comprise priority ratings encoded into one or more of its message portions. For example, in one embodiment, one or more of the 1 to 1 portions of a multi-packet broadcast data message can comprise encoded priority ratings (e.g., encoded into priority criteria fields—not shown). In another embodiment, the priority rating(s) can be encoded into the header.

Figure 7:
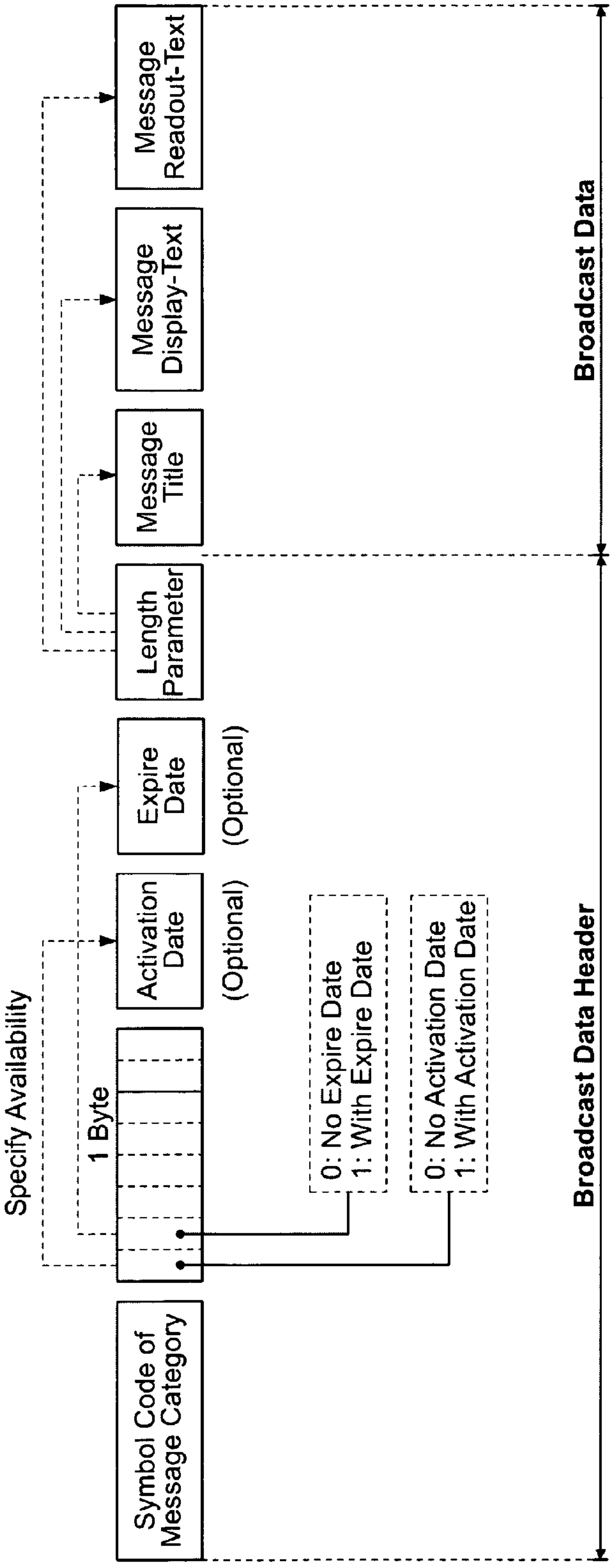
FIG. 7 is a block diagram of an embodiment of a broadcast data message.

With reference to FIG. 7, in one embodiment, the contents of the message data include message title data, message display-text data, and message readout-text data, which are converted into the broadcast data by the broadcast data converter 202. The converter 202 sets the parameters of the broadcast data message, such as the length, the activation date (i.e., when the message will be first shown to the operator), the expiration date (i.e., when the message will be deleted from a message storage device on the vehicle), and a symbol code indicating the message category or type. In one embodiment, the symbol code comprises the priority rating, which determines how frequently the message data is broadcast to the vehicles.

The aforementioned message parameters are typically encoded or stored in the broadcast data header. The converter 202 receives the FCX of the message data and creates a FCX section for the broadcast message data. The FCX section and the broadcast data portion are then fed into a common process for composing a combined message, referred to as Source Data.

Depending on the length of the message body, the broadcast message may be a single packet or multiple packets in length. For a single packet message, a header and CRC code is created and added to the Source Data to produce the Broadcast Packet. Alternatively, for a multiple packet message, the message body is partitioned into sections and each section has a header and CRC code added thereto. Separate Broadcast Packets are produced from each section. Whether a single packet message is created or a multiple packet message is created, the message is then passed from the center to the relay section 205, which may be provided by a satellite network (e.g., XM Satellite Radio) or the like, as discussed above. The relay section 205 formulates the message into a data format suitable for broadcast to the vehicles. For example, different channels of the broadcast spectrum may be adapted to carry different formats of the broadcast message.

FIG. 8 is a block diagram of an exemplary header for a single-packet message, showing the fields within the single-packet message, as well as exemplary associated data sizes. In one embodiment, the data sizes of the fields are on order of about one to four bytes; however, it will be understood that the data sizes of the fields can be varied according to the particular application. The packet type field can comprise the priority rating for determining the relative frequency with which the message is broadcast to the vehicles. This exemplary header may be utilized for the standard broadcast data message and the 1-to-1 linked type broadcast data message (discussed above). Likewise, FIG. 9 is a block diagram of an exemplary header for a multi-packet message, showing the fields of the message, as well as exemplary associated data sizes. The data sizes of the fields can be on order of about one to four bytes; however, the data sizes of the fields can be varied according to the particular application. In one embodiment, the packet type field comprises the priority rating for one or more of the data packets of the multi-packet message.

Having thus described a preferred embodiment of a method and system for prioritizing traffic information and broadcasting the traffic information in a prioritized order, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks.

What is claimed is:

1. A system for communicating traffic information, comprising:

an information center that generates and prioritizes broadcast data messages regarding traffic data associated with a plurality of roads, the information center sending the prioritized broadcast data messages from a remote location to at least one vehicle traveling on a current route to a destination point;

a database in communication with the information center, the database including information about the at least one vehicle's current route to the destination point;

wherein the information center is configured to assign a priority rating to each broadcast data message based on the information about the at least one vehicle's current route to the destination point and is further configured to send each broadcast data message from the remote location to the at least one vehicle at a frequency determined based on the assigned priority rating; and wherein the information center is configured to send broadcast data messages having a higher priority rating more frequently than broadcast data messages having a lower priority rating.

2. The system as recited in claim 1, wherein the priority rating is further based on a road type.

3. The system as recited in claim 2, wherein the road type is selected from the group consisting of major road, medium road, and minor road.

4. The system as recited in claim 1, wherein the priority rating is further based on whether or not the traffic data is associated with a particular one of the plurality of roads that is part of the at least one vehicle's current route to the destination point.

5. The system as recited in claim 1, wherein the information center comprises:

at least one server having a broadcast data message generator application executing thereon; and wherein the message generator application is configured to perform the functions of:

generating messages including the traffic data;

converting the generated messages into the broadcast data messages;

determining a timing to send the broadcast data messages to the at least one vehicle; and transmitting the broadcast data messages to the at least one vehicle.

6. The system as recited in claim 1, further comprising a one-to-many communication system for sending the prioritized broadcast data messages from the information center to the at least one vehicle.

7. The system as recited in claim 6, wherein the one-to-many communication system is configured to transmit the broadcast data messages over a satellite radio network.

8. The system as recited in claim 1, wherein each broadcast data message comprises filter data based on a characteristic of said at least one vehicle, said priority rating, and broadcast data comprising traffic data associated with at least one of said plurality of roads.

9. The system as recited in claim 1, wherein the priority rating is further based on a proximity of the traffic data associated with a particular one of the plurality of roads to a road that is on the at least one vehicle's current route to the destination point.

10. The system as recited in claim 9, wherein a first one of the broadcast data messages regarding traffic data associated with a first one of the plurality of roads is assigned a higher priority than a second one of the broadcast data messages regarding traffic data associated with a second one of the plurality of roads if the first one of the plurality of roads is closer than the second one of the plurality of roads to a road that is on the at least one vehicle's current route to the destination point.

11. A method for communicating traffic information from an information center located at a remote location to a vehicle traveling on a current route to a destination, comprising:

retrieving information about the vehicle's current route to the destination point from a database;

generating a broadcast data message including traffic data associated with at least one road;

assigning a priority rating to the broadcast data message based on the information about the vehicle's current route to the destination point;

sending the broadcast data message from the remote location to the vehicle at a frequency determined based on the assigned priority rating; and wherein the information center sends the broadcast data message having a higher priority rating more frequently than other broadcast data messages having a lower priority rating.

12. The method according to claim 11, wherein the information center comprises a server having a broadcast data message generator application executing thereon, the message generator application performing the steps of:

generating messages including traffic data associated with the at least one road;

converting the generated messages into the broadcast data message;

determining a timing to send the broadcast data message to the vehicle; and transmitting the broadcast data message to the vehicle with the determined timing.

13. The method according to claim 11, wherein assigning the priority rating is further based on whether or not the traffic data is associated with a road that is part of the vehicle's current route to the destination point.

14. The method according to claim 13, wherein assigning the priority rating further comprises:

comparing the traffic data associated with the at least one road with the information about the vehicle's current route to the destination point;

determining if the traffic data is associated with a portion of a road that is part of the vehicle's current route to the destination point; and wherein the information center assigns a higher priority rating to the broadcast data message if it determines that the traffic data is associated with a portion of a road that is part of the vehicle's current route to the destination point.

15. The method according to claim 11, wherein the priority rating is further based on a proximity of the traffic data to a road that is on the at least one vehicle's current route to the destination point.

16. The method according to claim 15, wherein the information center assigns a first broadcast data message including traffic data associated with a first road a higher priority than a second broadcast data message including traffic data associated with a second road if the first road is closer than the second road to a road that is on the vehicle's current route to the destination point.

17. The method according to claim 11, wherein the broadcast data message comprises filter data based on a characteristic of the vehicle, the priority rating, and broadcast data comprising the traffic data.

* * * * *